July 3, 1973     M. E. NICHOLAS     3,743,589
ELECTROCHEMICAL VAPOR DETECTOR
Filed Dec. 23, 1971     3 Sheets-Sheet 1
FIG. 1
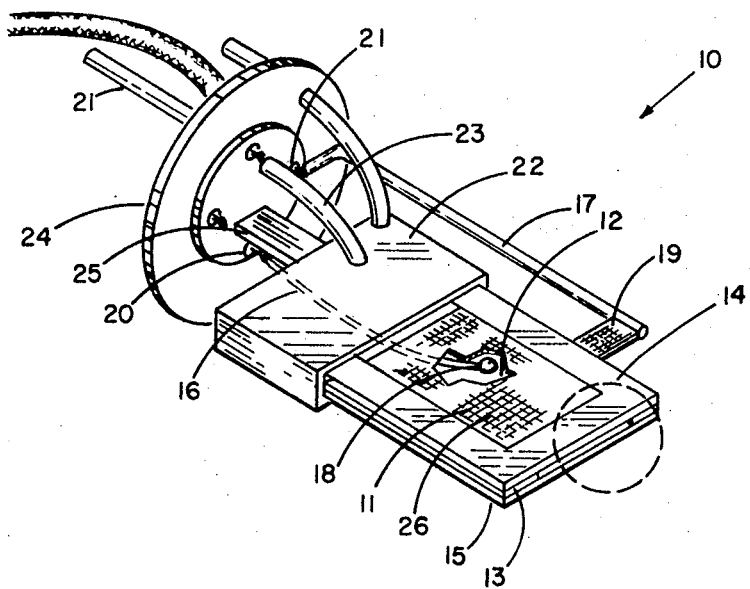
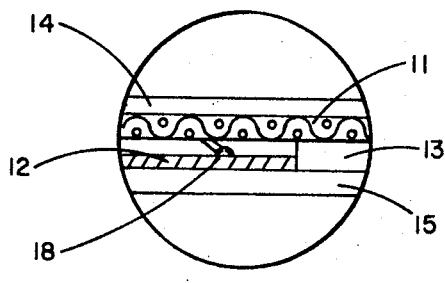
FIG. 1a
INVENTOR.
MERLE E. NICHOLAS
BY
ATTORNEY.

3,743,589
ELECTROCHEMICAL VAPOR DETECTOR
Merle E. Nicholas, Minneapolis, Minn., assignor to
Honeywell Inc., Minneapolis, Minn.
Filed Dec. 23, 1971, Ser. No. 211,224
Int. Cl. G01n 27/46
U.S. Cl. 204—195 R                    9 Claims

ABSTRACT OF THE DISCLOSURE

A potentiometric electrochemical detector for the quantitative determination of air-borne vapors which exhibits long-term base line voltage stability is disclosed. The system is especially useful in the determination of such compounds as ammonia and amines which have ionizable groups capable of readily forming reversible complexes with a metal sensing electrode at the vapor-electrode-electrolyte interface. A porous metal sensing electrode is disposed with an outer surface exposed to a sample stream and an inner surface exposed to a flowing electrolyte of partially de-ionized water. The flowing electrolyte provides a conductive path between the sensing electrode and a reference electrode, prevents contamination of the reference half-cell by dissolved electroactive species and, in conjunction with the air contacting the electrode, functions to reproduce a stable state of surface composition on the sensing electrode after exposure to a sample.

BACKGROUND OF THE INVENTION

Field of the invention

The present invention relates generally to potentiometric electrochemical detection of gases in a gaseous medium and, more particularly, a detector for the quantitative determination of compounds such as ammonia and amines which have ionizable groups capable of readily forming reversible complexes with a metal electrode in the presence of an electrolyte and one which exhibits a reproducible stable base line voltage.

Description of the prior art

In potentiometric devices of the type described, the sensor involved consists of three primary components. These are the sensing electrode (or cathode), the reference electrode (or anode) and an electrolyte between the two electrodes which electrically connects them. Each electrode becomes itself a half-cell which obeys the well-known Nernst equation with the electrical characteristics of the entire cell being dependent upon the algebraic sum of the characteristics of the half-cells. When an electrode is exposed to an electroactive species in the presence of the electrolyte, a reaction is initiated which changes the EMF of the half-cell in an amount related to the concentration of the species causing such reaction. From this, it can be seen that the most advantageous type of sensor would be one in which the potential of the reference half-cell remains constant so that the total change in EMF of the whole cell results solely from the presence of an electroactive species at the sensing electrode. It is also highly desirable that such a cell return to a stable base line voltage without the residual effects associated with the retention of ionic species from the gas sought to be determined in the electrolyte solution which might cause further reaction with either electrode. The term base line voltage as applied to such cells is defined as the EMF output of the cell at constant operating conditions in the absence of an electroactive species which upsets the electrochemical balance of either electrode.

The devices of the prior art have utilized a variety of electrode materials and ionic electrolyte species in an effort to produce a cell having a long-term stable base line voltage without success.

It has been found that an electrode, and most particularly a pure metal electrode, in the presence of an ionic electrolyte does not exhibit the ability to maintain a steady, reproducible base line voltage. This is thought to be primarily due to the fact that such an electrode does not obtain a reproducible equilibrium state of surface composition to which it returns after exposure to an electroactive species. Reactions with such species occurring at the interface of the electrode and surrounding electrolyte are dependent upon the surface composition of the electrode and, therefore, the repeatability of the magnitude of such reactions is dependent on the stability of such surface composition.

In the cells of the prior art, in the case of the sensing electrode, the resulting reaction with an electroactive species introduced in a sample gas produces a change in the surface composition of that electrode which is not reversed when the sample is removed. This phenomenon permanently changes both the base line EMF output of that half-cell and changes the magnitude of the EMF produced by a subsequent exposure of that electrode to a gaseous sample containing the same concentration of the same electroactive species. Thus, both the base line and span calibrations of such a device are quite unreliable. In addition, the reference half-cells of prior art devices have not exhibited sufficient long-term stability. Metal or metal-metal salt electrodes commonly used as reference electrodes, like the sensing electrodes, show a changing base line EMF when emersed in an electrolyte of dissolved ionic salt. Also, because some of the ions from the electroactive species of the sample are retained in the ionic electrolyte, the composition of that electrolyte may change and/or such ions may migrate to the reference electrode affecting the equilibrium in the reference half-cell thereby further upsetting the base line stability of the reference half-cell. From this, it can readily be seen that sensors of prior art construction were far less reliable than desired.

SUMMARY OF THE INVENTION

According to the present invention, the problems associated with maintaining base line voltage stability and achieving repeatability of total cell EMF response to a given percentage of an electroactive airborne species in a sample are solved by the provision of a detector having a unique electrochemical sensor which is inherently stable for long periods of time and exhibits long-term base line voltage stability. The sensor of the present invention comprises an electrochemical cell having a porous metal sensing electrode exposed to the sample stream, a metal reference electrode located in spaced relation to the sensing electrode and a reproducible, partially de-ionized flowing electrolyte connecting the electrodes electrically and isolating the reference electrode from the electroactive species of the sample stream. The metal forming the sensing electrode may be any one of a number of metals which exhibit a stable, reproducible surface oxide composition in the presence of air and a flowing electrolyte of distilled or de-ionized water. The reference electrode is one preferably from the same group of metals which exhibits a surface composition which remains essentially stable when submerged in the flowing distilled or de-ionized water. The sensor of the invention is capable of determining even trace amounts of air-borne ionizable molecular species such as ammonia or various amines, for example, which penetrate the porous metal sensing electrode to form reversible complexes with the electrode at the three-phase juncture formed by the electrode, electrolyte and the gaseous sample medium. This phenomenon produces a corresponding change in the cell EMF which can readily be measured by conventional amperometric or potentiometric means. The flowing electrolyte also prevents any contamination of the reference electrode by preventing dissolved ionic species in the sample from reaching the reference electrode. After the sample is removed, the distilled or de-ionized water electrolyte, in the presence of air alone, permits the reaction at the sensing electrode initiated by the ionizable species in the sample to reverse, returning the sensing electrode surface composition to the original stable form. The flowing electrolyte may be recirculated through a conventional ion exchange bed to remove any residual electroactive sample ions.

BRIEF DESCRIPTION OF THE DRAWINGS

In the drawings wherein like numerals are used to designate like parts throughout the same:

FIG. 1 is a perspective view, partially cut away, showing one embodiment of the sensor of the invention;

FIG. 1a is an enlarged view showing the laminar construction of the sensor in the circled portion of FIG. 1;

DESCRIPTION OF THE PREFERRED EMBODIMENT

Figure 2:
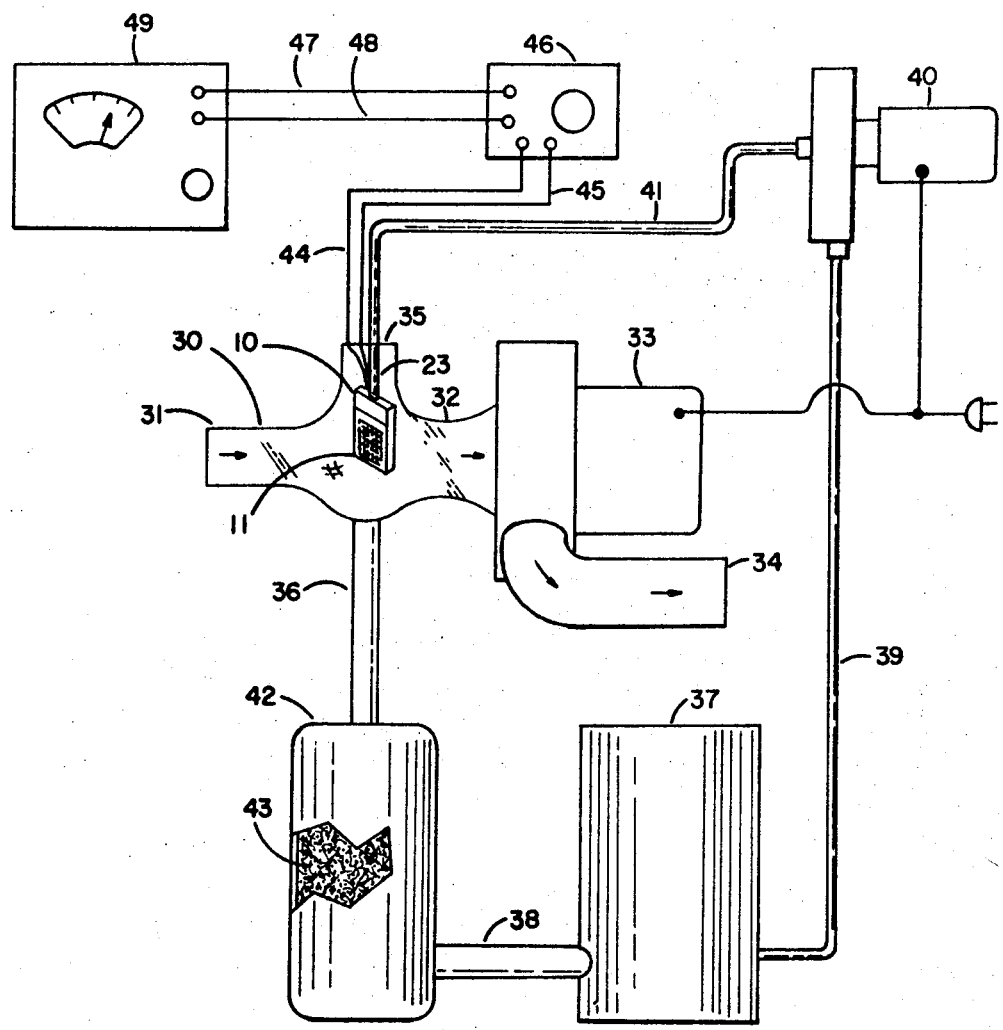
FIG. 2 is a diagrammatic view of a typical detecting apparatus constructed in accordance with the invention.

Turning now to the drawings, and in particular to FIGS. 1 and 1a thereof, there is shown generally at 10 a representative sensor constructed in accordance with the invention including a metal sensing electrode 11 and a reference electrode 12 in parallel spaced relation separated by spacers 13 and retained together in sandwich fashion by an upper retainer 14 and a lower support 15. Appropriate conventional electrical leads 16 and 17, which are utilized to monitor EMF output of the cell are attached to the reference electrode 12 and the sensing electrode 11, respectively, as at 18 and 19 in a well-known manner. The other ends of such conductors are terminated at sensor output terminals 20 and 21. Electrolyte from a continuously replenished source, discussed below, is provided to maintain a supply of such electrolyte in a reservoir 22, as by a tube 23. The sensor is secured to a mounting flange 24 as by an extension 25 of the support member 15.

As the case with other electrochemical detecting systems for determining the presence and amount of a gas in a gaseous mixture, the most important part of such a device is normally the particular construction of the sensor itself. Thus, before describing the remainder of the detector system and the operation and results obtained with such a system, the components of the sensor itself will be described in greater detail.

An important aspect of the present invention is the discovery that the changes in the surface composition of electrodes fabricated of certain metals which form complexes with ionizable electroactive species in the presence of an electrolyte associated with the operation of a conventional electrochemical sensing half-cell which produce undesirable fluctuations in the electrical output of such a half-cell under a given set of conditions can be overcome by a unique half-cell construction. It has been found that certain metal electrodes form surface compositions (thought to be intermediate oxides) which remain stable for long periods of time in the presence of air and a flowing electrolyte of distilled or de-ionized water. It has also been found that complexes formed between the electrode and an electroactive species adsorbed at the three-phase interface between the air-borne gas sample electrode and electrolyte are highly reversible in the presence of air and a flowing electrolyte of distilled or de-ionized water. Under these conditions, once the electroactive species sought to be sensed is removed from the air in the environment of the sensing half-cell, the surface composition of the sensing electrode soon returns to its original stable form when it is again exposed to the air and electrolyte only.

Any metal known to form a stable surface composition under the operating conditions of the sensor of the invention and capable of reversibly complexing with adsorbed electroactive species should provide a stable sensing electrode. Metals which have been successfully used as the sensing electrode 11 include copper, nickel, silver, tin, platinum, tantalum and stainless steel.

In order to achieve both rapid sample analysis and to lessen the delay in returning to the base line voltage, the sensing electrode-electrolyte interface must be readily accessible to the environmental gaseous medium (i.e., air or air-borne sample to be detected). To facilitate three-phase boundary contact, sensing electrode 11 should be made in a porous form and such form is that of a woven wire mesh having openings 26 therein. Openings 26 should be of such size that under normal conditions of electrode spacing and electrolyte flow, the electrolyte just fills the gap between the sensing electrode 11 and the standard or reference electrode 12 contacting only the inner surface of the electrode 11. For successful operation of the sensing half-cell, the outer surface of the electrode 11 must not be wet by the electrolyte. Successful sensing electrodes have been made utilizing a woven wire screen of copper having about 72 lines per inch of 0.0055 inch diameter wires.

The reference electrode 12 is separated from the sensing electrode 11 by a narrow gap which is normally of capillary dimensions, i.e., in a range from about 0.005 to 0.030 inch. During operation of the sensor, electrolyte is caused to flow continuously through the capillary spacing to provide a charge carrier and also to remove the dissolved reactants from the vicinity of the sensing electrode 11 before such reactants reach the reference electrode 12 and upset the half-cell constant potential of the reference electrode. As discussed above, the combination of sensing electrode pore size, inter-electrode spacing and electrolyte flow should be such that the interfacial forces of the electrolyte produce a condition whereby the inter-electrode capillary spacing is completely filled by the electrolyte flowing therethrough but in which the outer surface of the porous sensing electrode is not wet by the electrolyte. The reference electrode of the sensor is normally a metal in sheet form and any metal which exhibits a stable surface composition when submerged in the flowing distilled or de-ionized water electrolyte, thus producing a stable reference EMF, will make a successful reference electrode. Thus, silver and stainless steel have been used successfully and in one particular embodiment, a silver sheet of 0.005 inch thick was used in a successful sensor.

As discussed above, the chemical stability and reproducibility of the surface composition of the sensing electrode, and thus the reproducibility of its base line and sample EMF outputs, along with the stable reference half-cell potential of the reference electrode, its believed, are due in no small amount to the particular electrolyte used. Thus, distilled or substantially de-ionized water has been found to be the most effective electrolyte for the sensor of the invention. Experiments with weak aqueous solutions of ionic salts such as 0.0145 M NaCl, for example, to provide an electrolyte for the sensor have shown that such species upset the ability of the sensing electrode to reproduce its original stable composition and, in addition, after a period of time, may cause changes in the potential of the reference half-cell. The distilled or de-ionized water electrolyte does provide sufficient charge carriers to complete the electrochemical cell electrically. The flowing electrolyte also removes the electrode reactants from the vicinity of the sensing electrode thereby preventing contamination of the reference half-cell and, at the same time, speeding the recovery of the sensing half-cell from exposure to air-borne vapors to which such electrode is sensitive after removal of such constituent from contact with the electrode. The composition of the electrolyte is maintained constant by circulating the electrolyte through an ion exchange bed before recirculating it through the electrochemical cell. This accomplishes removal of substantially all of the dissolved ions which may have come into the electrolyte through the sensing process.

In normal operation, the sensing electrode 11 of the invention, then, is exposed to the atmosphere on one side and the flowing electrolyte on the other. Air-borne vapors pass through the screen openings, dissolve in the electrolyte and electroactive species therein react at the three-phase interface. This results in a change in composition of the sensing electrode surface which changes the electrical output of this half-cell according to the Nernst equation (above). Thus, for example, a copper screen electrode exposed to air alone on one side and a flowing electrolyte or de-ionized water on the other has a normal EMF which is controlled by a complex surface composition of the general form $Cu(O)$. Subsequent introduction of an air-borne vapor, for example, ammonia, introduces the reaction $Cu(O) = Cu(NH_3)$. This produces an EMF change at the sensing electrode 11 which is proportional to the concentration of air-borne ammonia in the sample. Upon removal of the sample and the residual of dissolved ammonia is swept away from the sensing electrode by the moving electrolyte and, at the electrode-electrolyte interface, the reaction reverses to re-establish the stable $Cu(O)$ electrode surface composition. Residual ionic species in the electrolyte are removed in an ion exchange bed by an ion exchange resin, described in connection with FIG. 2.

It should also be noted that the improved stability and reversibility of the surface composition of the sensing electrode 11 is dependent not only on the particular electrolyte used but also on the presence of the three-phase interface. Even when using the electrolyte in accordance with the invention this performance could not be achieved with a completely immersed sensing electrode. In fact, complete immersion of the sensing electrode in the electrolyte drastically affects the base line voltage of the sensing half-cell. To augment the prevention of the wetting of the outer surface of the sensing electrode accomplished by controlling the flow of the electrolyte, a desired portion of the outer surface can be permanently coated with a polymeric material to prevent wetting of the metal surface. Of course, the bare electrode surface must be maintained at the three-phase interface.

Turning now to FIG. 2 of the drawings, there is pictured schematically a typical detector system utilizing the sensor of the invention. The system includes a cell 30, which may be made of glass or other substantially rigid chemically inert material, and having a gas inlet 31 and exit throat 32 which leads to the inlet of a sample pump 33 and an outlet 34. Top opening 35 is provided for mounting the sensor 10 within the cell 30 and an electrolyte drain 36 is provided to collect electrolyte after it leaves the sensor 10. The sensor 10 may be mounted within the cell 30 as by flange 24 (FIG. 1) in any suitable disposition which allows both the gravity flow of electrolyte between the electrodes 11 and 12 (also FIG. 1) and exposure of the sensing electrode 11 to a gaseous mixture flowing through the cell between the inlet 31 and outlet 32 thereof. Flange 24 is normally sealed about the opening 35 to prevent the entry of extraneous gases into the cell 30.

In addition to the sample circulation system described above, an electrolyte circulation system is provided which includes an electrolyte reservoir 37 having inlet and outlet conduits 38 and 39, respectively, an electrolyte pump 40 having an inlet connected to conduit 39 and an outlet tube or conduit 41 which connects the output of the pump with sensor supply line 23 to supply electrolyte to the sensor reservoir 22 (FIG. 1). Electrolyte drain 36 leads to an ion exchange chamber 42 which contains a conventional mixed bed ion-exchange resin shown in the cutaway at 43. The containers 37 and 42, along with the conduit tubing of the system and the parts of pump 40 which contact the electrolyte may be made of any conventional material which is substantially chemically inert to the internal environment so that no additional ionic species will be introduced into the electrolyte to change its properties. Thus, such parts may be made of polyethylene or polyvinyl chloride, for example. Pump 40 should be one capable of delivering a constant predetermined volume of electrolyte to the sensor and a peristaltic type pump has been used with success.

In operation, the electrolyte is pumped from the reservoir 37 to the pump 40 by means of the tube 39 and a constant volume is delivered from the pump through lines 41 and 23 to maintain a constant supply in the electrolyte reservoir of the sensor. The electrolyte then flows through a sensor by gravity, draining into the ion-exchange chamber 42 and through drain line 36 from which it replenishes the reservoir 37 through connecting line 38. While various methods can be employed to introduce air or an air-borne sample to the sensor 10 in the cell 30, connecting the outlet throat 32 to the vacuum or intake side of the pump 33 and gently aspirating the sample through the inlet throat 31, allowing it to sweep across sensing electrode 11 of sensor 10, exiting through outlet 32 and through the pump 33 to final discharge outlet 34 has produced the most uniform successful sensing results. The final discharge outlet 34 is positioned so that re-entry of the discharged sample at the entry throat 31 will not occur. Any conventional gas pumping device which will accomplish this purpose may be utilized. Extraneous gases are prevented from entering the system by sealing the flange 24 (FIG. 1) about the periphery of the opening 34 after the sensor is positioned in the cell 30. Any gas-tight sealing maskant compatible with the system may be used for this purpose.

Figure 3:
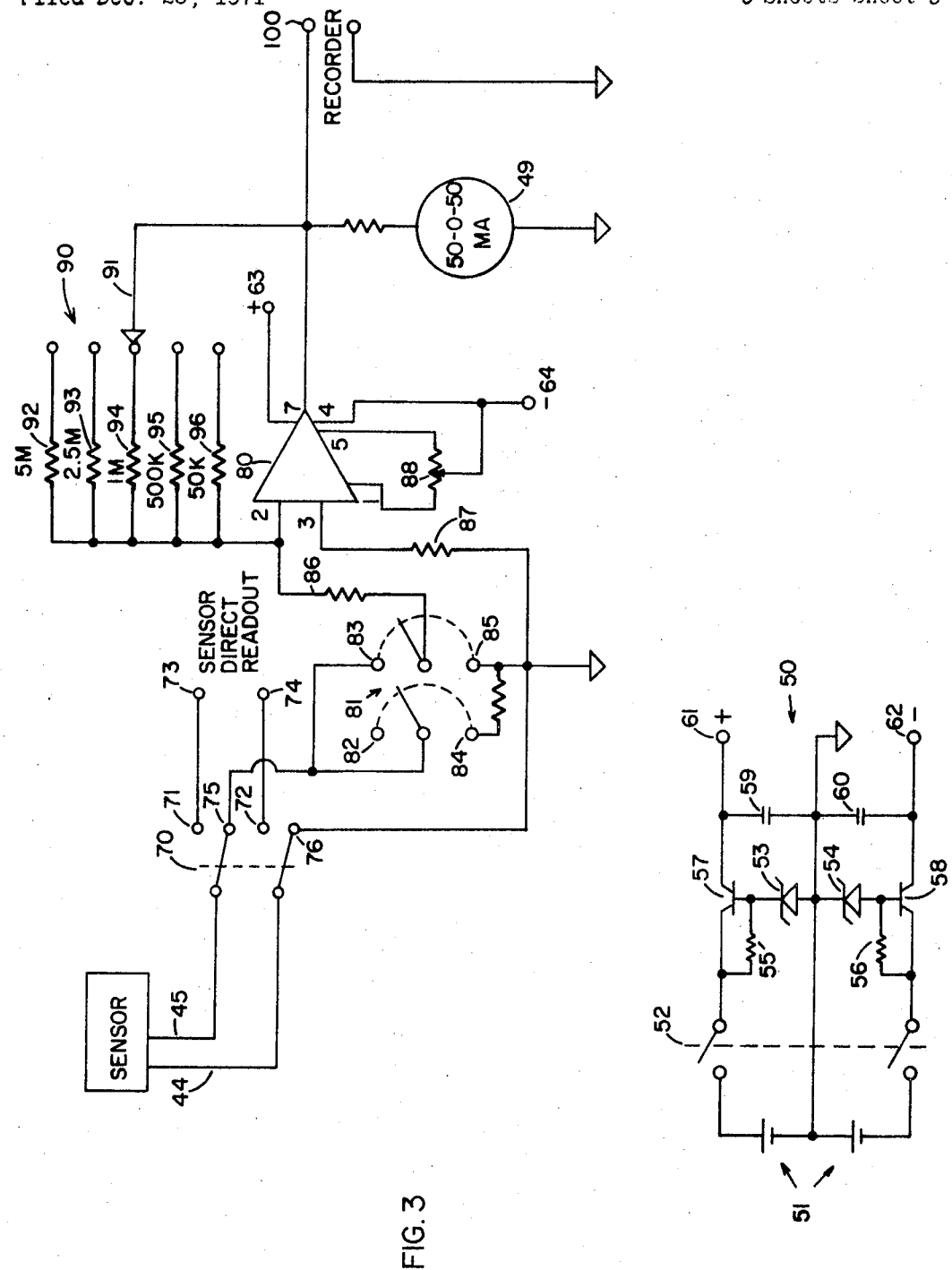
FIG. 3 is a diagrammatic view of a meter circuit for the detector of the invention.

An external electrical system associated with the detector is shown schematically in FIG. 2 with the signal amplification system being shown in greater detail in FIG. 3. Thus, generally, conductors 44 and 45 connect the electrodes of the sensor 10 with a signal processing system shown generally at 46 and additional conductors 47 and 48, in turn connect the amplified signal with a readout meter at 49. The meter may be either a microammeter or a microvoltmeter and because the response of the cell to various species may be either positive or negative, a zero-center meter is used for this purpose.

Turning now to the more detailed description of the signal processing system shown in FIG. 3, we see at 50 a conventional regulated external potential source including therein a separate identical potential source 51 connected through a switch 52 to a conventional voltage regulation system which may include matching Zener diodes 53 and 54, resistors 55 and 56, transistors 57 and 58, and capacitors 59 and 60 to complete the system in a well-known manner. The system terminates in conventional output conductors 61 and 62 which connect with corresponding conductors 63 and 64 to provide the supply voltage for the operation amplifier 80 at corresponding supply voltage terminals 7 and 4, respectively. While any comparable operation amplifier may be employed in the system of the invention, a Fairchild type uA 741 operational amplifier manufactured by the Fairchild Semiconductor Division of Fairchild Camera and Instrument Corporation, Mountainview, Calif. has been successfully employed.

The illustrated example of the signal processing system shows a typical utilization of the output of the sensor 10. Thus, the total EMF from the sensor 10 is conducted through conductors 44 and 45 to a switch 70 which, in its alternate positions, connects the total sensor EMF output either to terminals 71 and 72 from which it can be read directly by conventional means placed across corresponding terminals 73 and 74, or into the amplification system via terminals 75 and 76. The input of the amplification system is provided with a double pole, double throw switch 81 which, in a conventional manner, provides for a zero-adjust position and also a normal operating or reading position. Thus, when the switch is closed contacting terminals 82 and 83, the sensor signal proceeds normally into the amplifiaction system and, conversely, the switch is closed across terminals 84 and 85 a zero adjustment may be made. The remainder of the system includes input impedance matching resistors 86 and 87, a zero-adjust potentiometer 88, the amplifier 80 and an conventional negative feedback system 90. The negative feedback system includes a range selection switch 91 which allows the output signal to be fed back through any one of a plurality of feedback impedances at 92 through 96. This, of course, allows adjustment of the deflection produced by a given signal at the zero-center meter 49. The meter 49, of course, may be any suitable conventional meter and may be designed to monitor either the voltage or current output in a well-known manner. A wide range of resistances available in the feedback system is required to compensate for the wide variance in sensor response due to its sensitivity to a large number of electroactive species over a wide range of concentrations. The amplification system may be connected in a conventional manner to a strip chart or other recording device as indicated at 100.

As indicated above, the sensor of the invention is sensitive to a wide variety of electroactive species which (1) are soluble in the electrolyte (ionization to some degree is assumed) and (2) when dissolved such species must adsorb on, or in some other manner react, with the surface of the sensing electrode. Thus, a sensor fabricated in accordance with the present invention responds readily to the presence of amines, most acids and oxygen; but shows no response to aldehydes, alcohols, hydrocarbons, halogenated hydrocarbons and ketones. Probably the most important application of the sensor of the invention is in the detection of ammonia, amines, certain other airborne odors and oxygen.

When the sensor of the present invention is exposed to an amine, the change in cell EMF in response to such exposure has been found to be directly proportional to the airborne vapor concentration. The direction of such response is positive, i.e., in the direction of the reference EMF. Such voltage output has been found to be constant for a given level of concentration and, in addition, if several different amines and/or ammonia are combined simultaneously in a single airborne vapor sample, the response has been found to be linearly additive. Thus, if a vapor containing a given concentration of monoethanol amine produces a change in sensor EMF of A and a given concentration in a different airborne sample of methyl amine, for example, produces a total sensor EMF change of B, an airborne sample simultaneously containing like concentrations of both monoethanol amine and methyl amine will produce a total EMF change in the sensor of $A+B$. Some deviation from this additive response can occur at very high concentrations of amine vapors, however. At very high concentrations, the sensor EMF level may tend to be less than that expected from a purely linear relationship. This phenomenon is observed because at very high concentrations, part of the vapor passes through the electrolyte and is adsorbed on the reference electrode before it can be swept away by the flowing electrolyte. The resulting reaction occurring at the standard or reference electrode generates an EMF which opposes that generated at the sensing electrode thereby decreasing the total sensor EMF. It has also been observed that after the sensor is no longer exposed to such an electroactive species the rate at which the reaction at the sensor reverses to return it to its stable surface composition has been observed to be much slower at the reference electrode than at the sensing electrode due to the fact that the reference electrode is exposed only to the electrolyte. Thus, with the exception of very high concentrations, ammonia in many of its combined forms including amines and amides can be detected over a wide range of concentrations in airborne vapor.

Ammonia, for example, can be detected over a range of concentrations from about 0.1 p.p.m. to one of several hundred p.p.m. To show the high degree of sensitivity of the device, the threshold of smell for the human nose is somewhere in the range of 15 p.p.m. This means that the detector of the present invention can effectively be used to detect the presence of ammonia in concentrations of about one percent of that at which a human being would become aware of its presence.

The sensitivity of the device of the invention over a very wide range of vapor concentrations is enhanced by the provision of the range selector switch 91 which allows selection of readout ranges which varies by a ratio of 100 to 1 in proceeding from position 92 to 96. When the device is utilized in the detection of ammonia compounds, base line voltage is initially adjusted to produce a zero reading on the output meter by a simple adjustment of the compensating potentiometer 87. Because of the stability of the base line voltage, as described above, once set, this zero reading remains stable for long periods of time.

The reaction of the sensor of the invention to concentrations of oxygen has also been found to be substantially linear at all concentrations from 0 to 100 percent oxygen. The presence of oxygen produces a change in sensor EMF opposite to that experienced in the detection of amines, with the amines showing a positive deflection on the zero-center meter and oxygen a negative deflection. The additive effects of vapors discussed above in connection with ammonia and amines has also been shown to be the case with oxygen. Of course, the addition of EMF's is algebraic and a vapor containing a plurality of electroactive species producing EMF values having opposing signs will cancel to the extent of the opposing EMF's. In oxygen determinations, it is also necessary to determine the stable base line voltage by introducing the sample of an inert gas such as argon because the readings based upon airborne vapors, of course, are compensated for the amount of oxygen in the air.

The sensor of the invention has also been found to be quite sensitive to acids having the required properties to be sensed including soluble aliphatic and aromatic carboxylic acids, along with inorganic acids such as nitric and hydrochloric, for example.

The response time of sensors made in accordance with the present invention has been found to be extremely rapid. Thus, at normal rates of electrolyte flow and sample flow, the response time has been shown to be generally less than 0.5 seconds. Slightly more time is required for samples containing a high concentration of an electroactive species only because the magnitude of the response is much greater. The recovery time constant, which may be defined as the time required to traverse 63.2 percent of the total transient, has been found to be more dependent upon the particular electroactive species sensed and the concentration of that species in the sample. When the electroactive species sought to be sensed is in the form of an amine or oxygen, with the exception of a sample having a very high concentration of such species, recovery of the sensor has been found to be quite rapid. After exposure to ammonia, an amine or oxygen, the recovery time constant for sensors fabricated in accordance with the present invention varies from about 10 seconds to 1 minute depending upon the particular species sensed, its concentration in the sample and the electrolyte flow through the sensor. The recovery time constant for the sensor after exposure to acids, and particularly to carboxylic acids such as formic and acetic acid, for example, has been found to have a second and somewhat slower time constant than that for the electroactive species just discussed. This phenomenon is thought to be because the reaction of the sensing half-cell is not as highly reversible for such acids. This results in there being some residual acid complexed at the three-phased surface. In the case of formic acid, for example, there would be sites of Cu(OOCH) which remain instead of a complete desorbing and reverting to Cu(O). This residual condition may result in some displacement of the original base line voltage; however, it does not represent a major deterrent to the use of this sensor because this effect can be readily overcome by subsequently exposing the sensor to an amine.

In addition to the typical compounds discussed above, a detector fabricated in accordance with the present invention has been shown to be sensitive to common airborne odors such as cigarette and match smoke and even to human body odors. For example, when a detector fabricated in accordance with the present invention was placed in a chemical fume hood and a human subject was placed in an incoming stream of fresh air, the device detected the presence or absence of this person in spite of seeing but a fraction of the total sample passing through the hood. From this, the adaptability of the sensor of the present invention to be utilized as a personnel detector in selected applications can readily be seen.

The embodiments of the invention in which an exclusive property or right is claimed are defined as follows:

1. A device for sensing the presence of a gas in a gaseous mixture including a porous metal first electrode having a surface exposed to the gaseous mixture, a second metal electrode supported in spaced relation to said first electrode and defining a region therebetween, an aqueous electrolyte disposed between said first and said second electrodes filling the space therebetween and isolating said second electrode from said gaseous mixture, wherein said metal first electrode is one selected from a group of metals which form a tight reversible surface oxide which remains stable in the presence of air and the aqueous electrolyte, and wherein said electrolyte is one having substantially all ionic species removed therefrom and means for determining the electrical potential between said first electrode and said second electrode.

2. The device as claimed in claim 1 wherein said first electrode is provided with a plurality of openings therein of a size which allows free ingress and egress of the molecules of a gaseous mixture but small enough to prevent the electrolyte from passing therethrough to wet the outer surface of said first electrode.

3. The device as claimed in claim 2 wherein the metallic first electrode is in the form of a woven wire grid.

4. The device as claimed in claim 3 wherein the said second electrode comprises a metal selected from the same group as that of the first electrode.

5. The device as claimed in claim 4 wherein said second electrode is comprised of the same metal as said first electrode.

6. The device as claimed in claim 2 wherein the metallic first electrode is in the form of a perforated plate.

7. The device as claimed in claim 1 wherein said electrolyte is de-ionized water.

8. The device as claimed in claim 1 wherein said electrolyte is distilled water.

9. The device as claimed in claim 1 wherein the metal comprising said first electrode is one selected from a group of metals consisting of copper, nickel, silver, tin, platinum, tantalum and stainless steel.

References Cited
UNITED STATES PATENTS

| | | | |
|---|---|---|---|
| 2,805,191 | 9/1957 | Hersch | 204—195 R |
| 3,314,863 | 4/1967 | Hersch et al. | 204—1 T |
| 3,328,204 | 6/1967 | Grubb | 204—195 R |
| 3,432,403 | 3/1969 | Glass et al. | 204—195 R |
| 3,470,071 | 9/1969 | Vertes et al. | 204—195 R |
| 3,493,484 | 2/1970 | Berg et al. | 204—195 R |

TA-HSUNG TUNG, Primary Examiner